United States Patent [19]

Ashare et al.

[11] 4,045,851
[45] Sept. 6, 1977

[54] METHOD OF FABRICATION OF HOLLOW FILAMENT SEPARATORY MODULE

[75] Inventors: Edward Ashare, Framingham;
Richard N. Rulison, Medfield;
Lawrence T. Wright, Whitman;
Myron J. Coplan, Natick, all of Mass.

[73] Assignee: Albany International Corporation, Albany, N.Y.

[21] Appl. No.: 507,714

[22] Filed: Sept. 20, 1974

[51] Int. Cl.² ............................................. B01D 31/00
[52] U.S. Cl. ............................. 29/157 R; 210/321 R; 210/433 M; 210/497.1
[58] Field of Search ................. 264/257, 258, 41, 103; 210/22, 497.1, 23, 321, 433; 156/229, 160, 161; 29/163.5 F, 157 R

[56] References Cited

U.S. PATENT DOCUMENTS

| 3,276,996 | 10/1966 | Lazare | 210/22 |
| 3,422,008 | 1/1969 | McLain | 210/497.1 X |
| 3,547,272 | 12/1970 | Shaines et al. | 210/490 X |
| 3,870,637 | 3/1975 | Miyoshi et al. | 210/497.1 X |

Primary Examiner—Frank A. Spear, Jr.

[57] ABSTRACT

A method of making a module for use in processes such as reverse osmosis, ultrafiltration, dialysis, and the like in which hollow filaments to be utilized as semi-permeable membranes comprise a coreless annular array of helically wound filaments.

5 Claims, 22 Drawing Figures

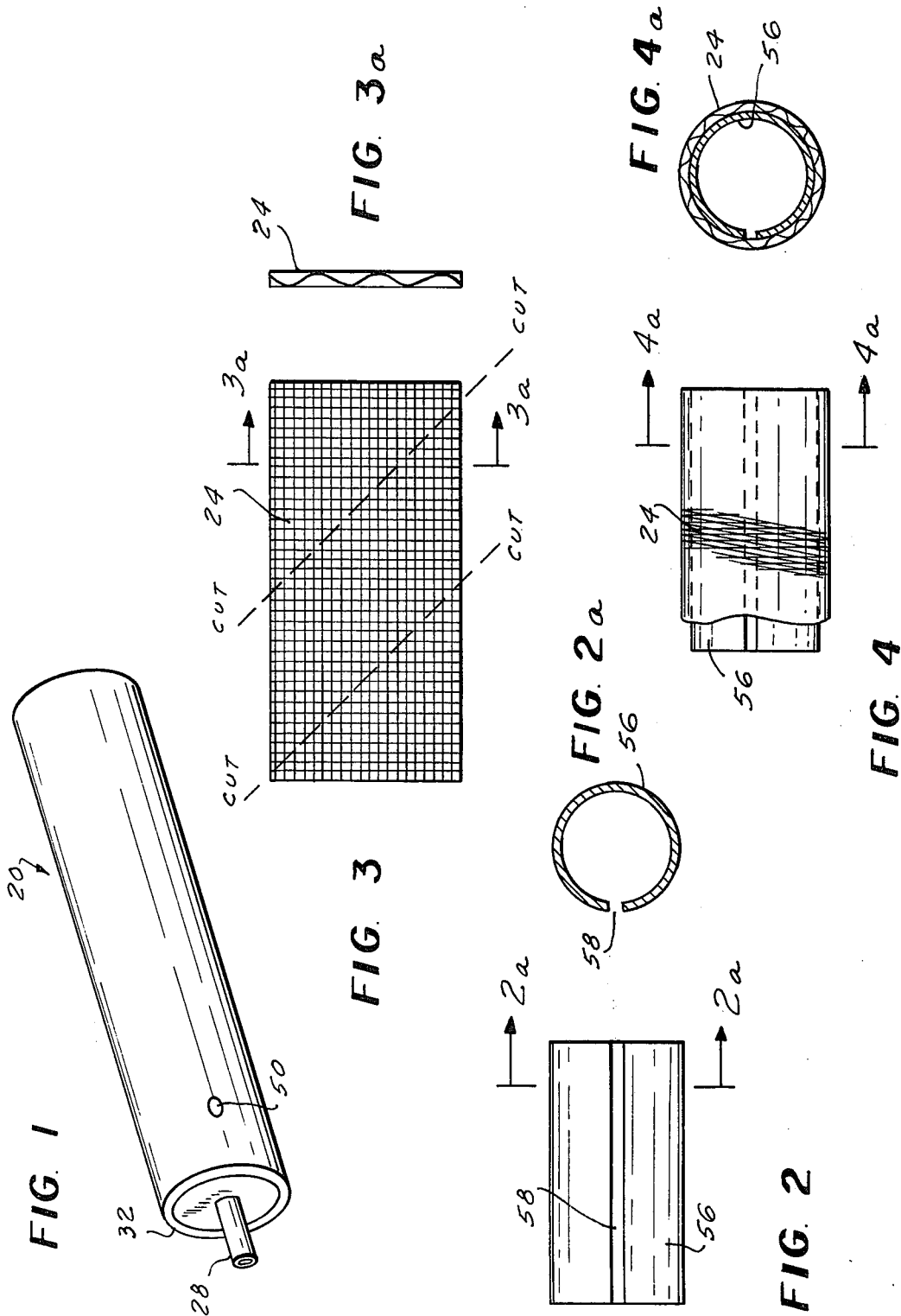

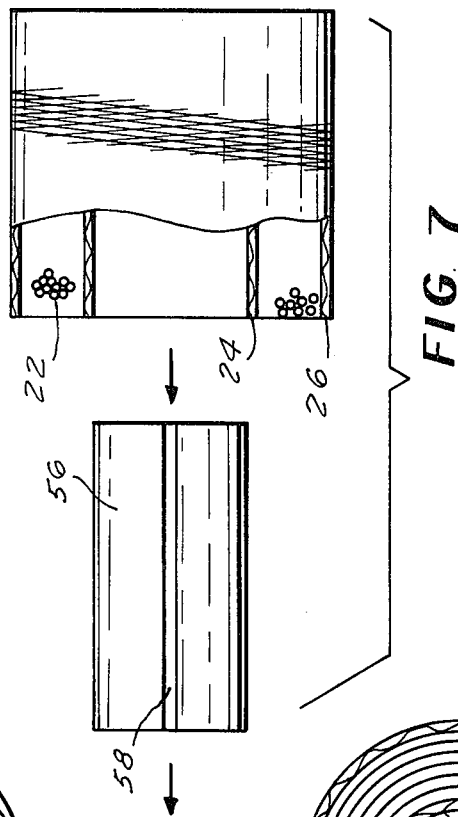
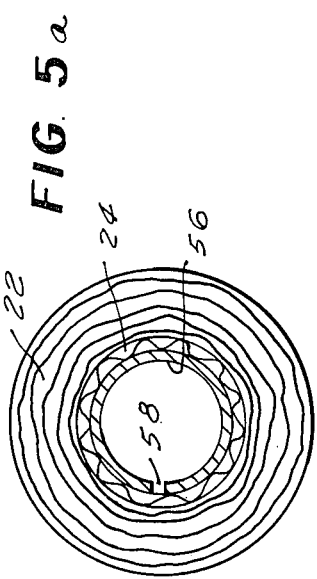
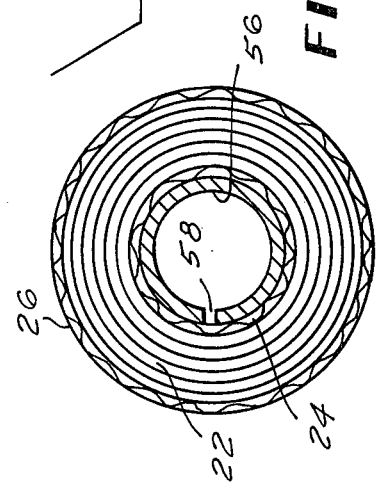
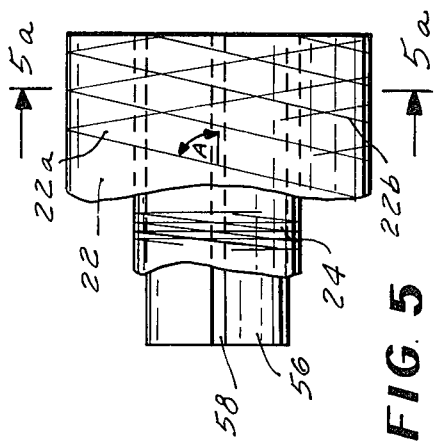
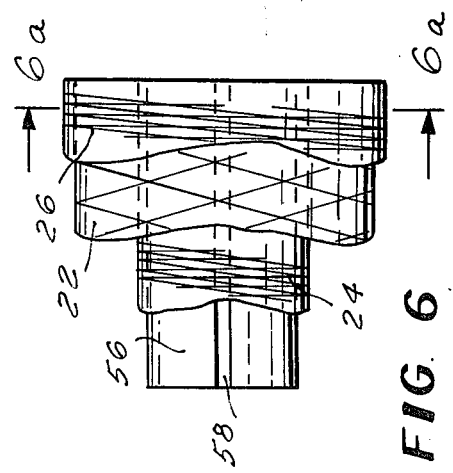

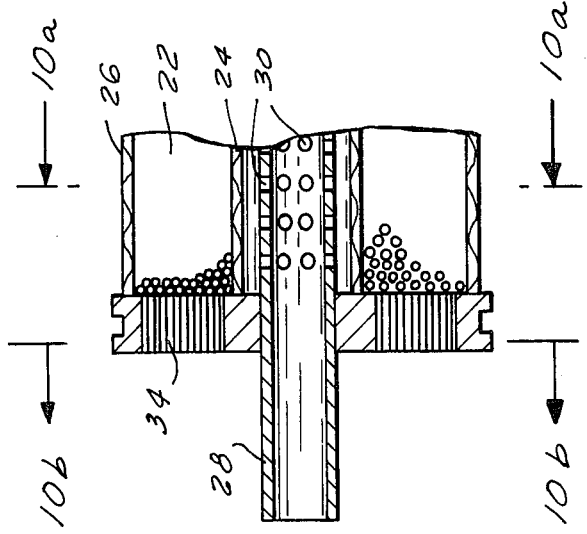
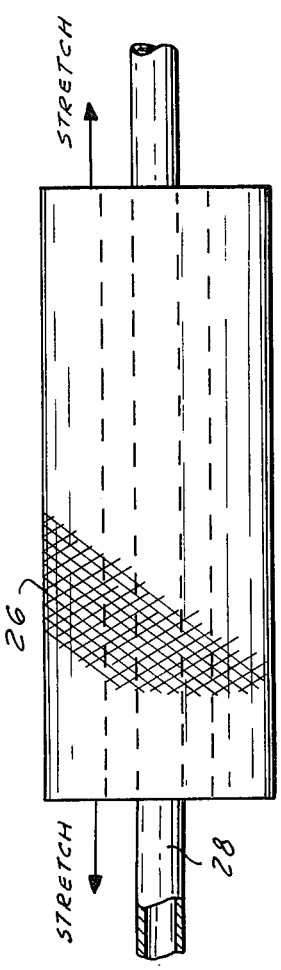
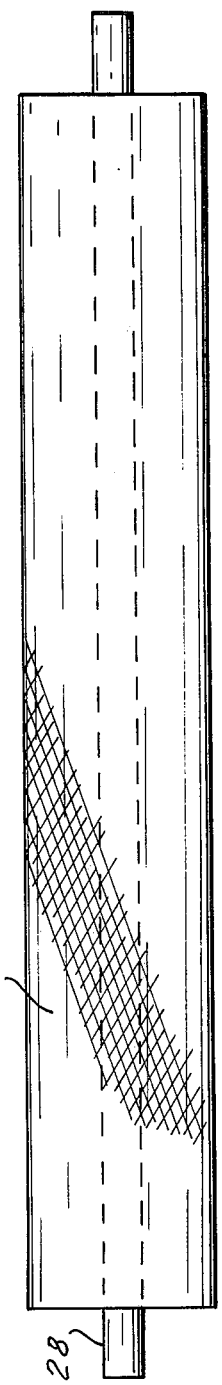

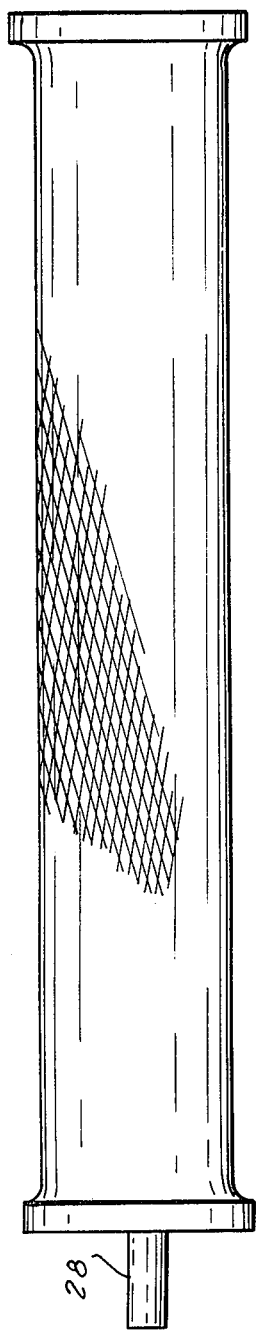
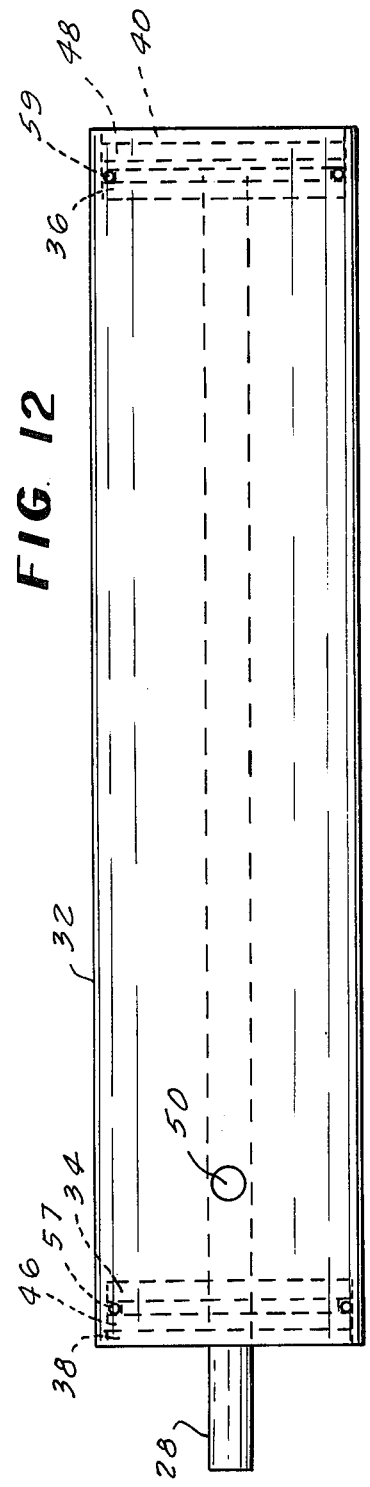
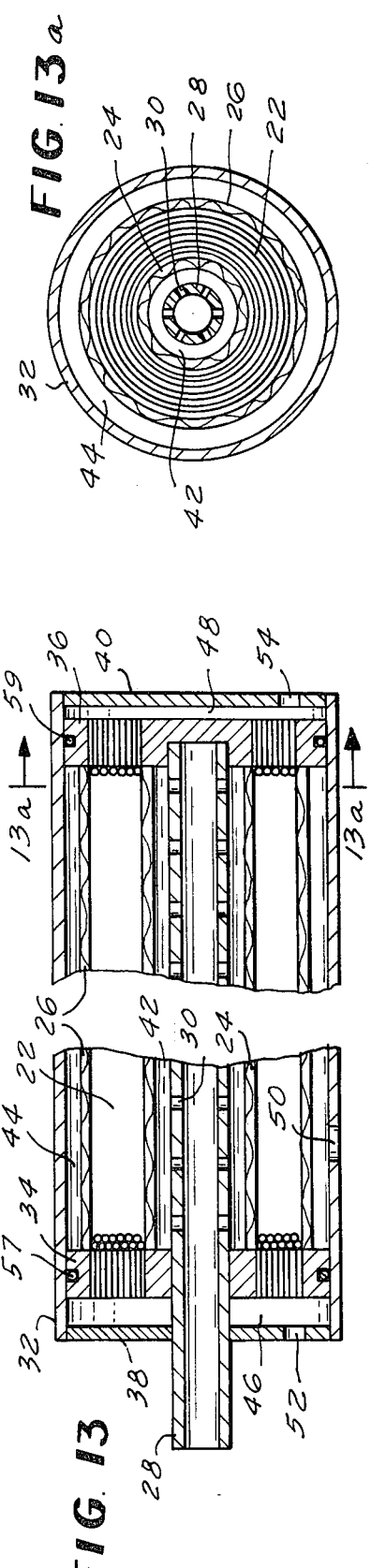
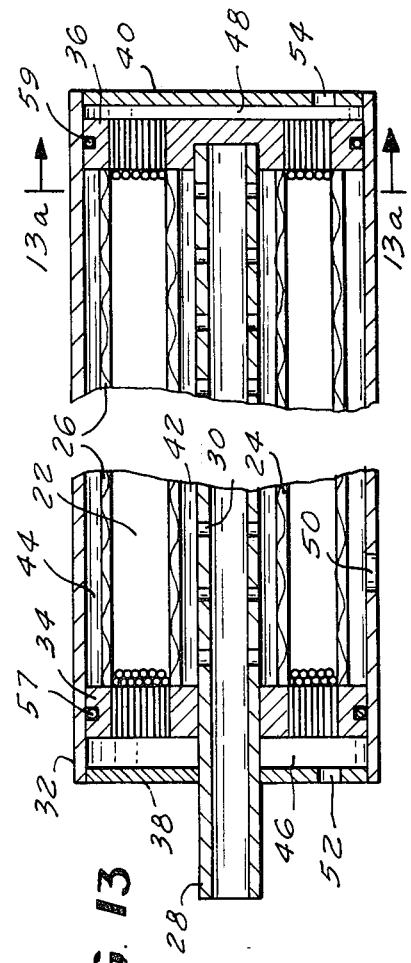

METHOD OF FABRICATION OF HOLLOW FILAMENT SEPARATORY MODULE

BACKGROUND OF THE INVENTION

The use of hollow monofilaments in connection with reverse osmosis and other separation and purification procedures is old and well known as shown in McLain U.S. Pat. No. 3,422,008, issued Jan. 14, 1969, to Dow Chemical Company, and as shown in report PB233,102 of the Monsanto Research Corporation, dated September, 1973, to the U.S. Department of the Interior.

A variety of methods is known to prepare the filament bundle assemblage. Many of these are intricate and many involve complex steps of winding with special machinery and utilization of porous sheets which act as support members.

In a module, a properly assembled multifilament array must meet a number of specifications. Among these is a geometric arrangement which provides a fairly high packing density and which at the same time minimizes channeling of the feed fluid as it passes among the filaments. Therefore, some method of keeping filaments from packing densely in certain areas and loosely in other is desirable. In other words, packing density of the filament array should be both very uniform and in the order of about 25% to 60%, if some of the main advantages of the use of hollow filaments are to be achieved. In view of these considerations the use of various filament assembly techniques is frequently unattractive.

SUMMARY OF THE INVENTION

This disclosure relates to a new method of preparing a hollow filament assembly and to a filament assembly made by this method for use as a semi-permeable membrane in various fluid processes involving osmosis, reverse osmosis, ultrafiltration, dialysis, and the like.

The present invention involves an improved simplified method for preparing arrays of hollow tubular filaments and also to the arrays prepared by such a method and which can be used in connection with the above-indicated purification and separation processes. According to this method, a single hollow monofilament or a small bundle of hollow filaments may be wound using ordinary textile winding machines on a cylindrical support, such as, preferably, a shell or tube, to provide a wound up package which is thereafter extended to achieve proper orientation of the filaments. According to the preferred procedure, the shell or tube is subsequently extracted from within the annulus of filaments wound upon it. A macroporous extensible sheet-like member may be wound about the shell prior to the collection of filaments thereon. The hollow filaments or bundles thereof are then wound either directly upon the cylindrical support or the extensible sheet-like member to a moderate depth and the helix angle of the wind, which is the angle that the helix makes with the cylinder axis, is selected to comply with precalculated extension requirements for the annulus of filaments. After the winding is completed, another extensible sheet-like member may be wound around the exterior of the annulus of filaments. The support cylinder is then withdrawn. The annulus of filaments, whether supported between two extensible sheet-like members or not, is then gripped at opposite ends and pulled longitudinally so as to extend the entire assembly in the order of up to five times the original length. Thus, for example, a 6-inch assembly may be extended to 30 inches, and the diameter at the same time is thereby reduced. When the assembly is wound with extensible sheet-like members interiorly and exteriorly encompassing the annulus of filaments, these sheet-like members may project beyond the ends of the annulus. The projecting ends of said members are then means for gripping the entire assembly for the purpose of extending the same longitudinally. In reoriented length and diameter, the assembly, with or without the extensible sheet-like members, then represents a coreless cylindrical annulus of helically wound filaments which can thereafter be processed by suitable embedding and other assembly techniques requisite to the module fabrication. The invention in addition, also contemplates the use of a single extensible member, either inner or outer.

While it is not a necessary feature of our invention, the filament array may be extended after removal of the support cylinder with a perforated or porous central dispersion tube a small diameter inserted through the center thereof. By this means, the annular array of filaments, when contracted radially by virtue of the axial extension, may be pulled down into close proximity to the small diameter dispersion tube which will subsequently be fabricated along with the array into the module.

By the foregoing means, it is obvious that a substantial improvement in the ease of filament assembly has been taught. The use of conventional textile winding equipment with elementary modifications is made possible. In addition, by the selection of appropriate helix winding angles and cylinder diameters, a wide range of final array configurations can be achieved. Moreover, the process is generally non-injurious to the relatively easily damaged hollow filaments, thereby reducing problems of preparation of defective modules due to damaged fibers. In addition to the ease of module fabrication and the protection of filaments from damage, the annular array of filaments comprises a unique geometry having a helically wound filaments thereby providing a self-supporting unit having controlled and uniform packing density, thus eliminating flow channels as previously discussed. In addition, the unique assembly geometry inhibits filament migration within the module during use, so that the tendency to pack overtightly in local regions due to hydraulic forces acting within the module, is eliminated. These and other advantages will be made more evident in the invention disclosure.

BRIEF DESCRIPTION OF THE DRAWINGS

In the accompanying drawings:

FIG. 1 is a perspective view of a wound hollow filament module constructed in accordance with the teachings of this invention;

FIG. 2 is a longitudinal view of one form of cylindrical winding support about which hollow filaments are wound during the fabrication of the module shown in FIG. 1 and which support is removed prior to completion of the module;

FIG. 2a is a sectional view of the support shown in FIG. 2 taken along the line 2a—2a in the direction of the arrows in FIG. 2;

FIG. 3 is a view of an inner woven fabric or scrim, one form of macroporous extensible sheet-like member, in flattened condition, which is used in the fabrication of the module shown in FIG. 1;

FIG. 3a is a sectional view taken along the line 3a—3a in the direction of the arrows in FIG. 3;

FIG. 4 is a partially sectional longitudinal view of the fabric of FIG. 3 placed on the winding support of FIG. 2 with the fabric pre-stretched around the support in a direction perpendicular to the support axis;

FIG. 4a is a sectional view taken along the line 4a—4a in the direction of the arrows in FIG. 4;

FIG. 5 is a partially sectional longitudinal view with hollow filaments wound on the assembly of FIG. 4;

FIG. 5a is a sectional view taken along the line 5a—5a in the direction of the arrows in FIG. 5;

FIG. 6 is a partially sectional longitudinal view of the assembly of FIG. 5 with an outer fabric or scrim similar to that shown in FIG. 2 placed thereon over the wound hollow filaments;

FIG. 6a is a sectional view taken along the line 6a—6a in the direction of the arrows in FIG. 6;

FIG. 7 is a partially sectional exploded view illustrating the removal of the winding support from the assembly during construction of the module of the invention;

FIG. 8 is a partially sectional longitudinal view illustrating the stretching step of the present method of fabricating the module with a feed tube shown inserted;

FIG. 9 is a partially sectional longitudinal view showing the angular relations of the wound filaments and the yarns of the inner and outer fabrics after the stretching step of FIG. 8;

FIG. 10 is an enlarged segmentary view of one end of the module of FIG. 1 showing the hollow filament ends embedded in an embedding or closure medium;

FIG. 11 is a longitudinal view of the completed filament assembly with feed tube inserted;

FIG. 12 is a partially sectional longitudinal view of the completed module;

FIG. 13 is a partially sectional segmentary view illustrating the ends of the completed module; and FIG. 13a is a sectional view taken along the line 13a—13a in the direction of the arrows in FIG. 13.

DESCRIPTION OF THE PREFERRED EMBODIMENT

Figure 10A:
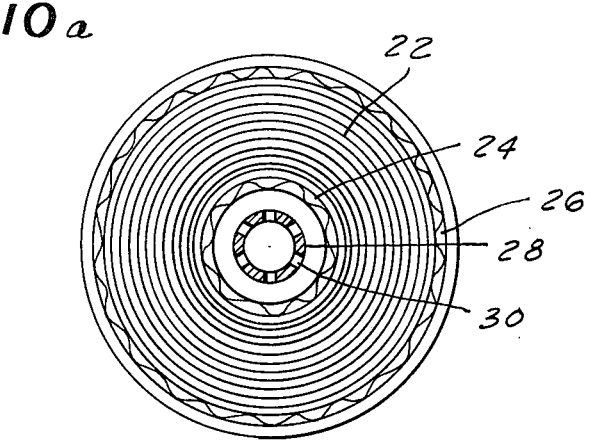
FIG. 10a is a sectional view taken along the line 10a—10a in the direction of the arrows in FIG. 10.

A module constructed in accordance with the teachings of this invention is designated in the Figs. generally by the numeral 20. The module in completed form is seen in FIG. 1 and FIGS. 11-13a and consists essentially of annulus 22 formed of permeable hollow filaments, inner and outer layers of extensible sheet-like member, consisting here of fabric or scrim, respectively indicated by the numerals 24 and 26, a central hollow conduit 28 extending longitudinally on the axis of annulus of filaments 22 with a plurality of perforations 30 formed therein, cylindrical casing 32 surrounding annulus of filaments 22 and fabric 24 and 26, embedding members 34 and 36 at either end of the assembly and through which filament ends extend, and end caps 38 nd 40.

As shown in FIG. 13, the annulus of filaments 22 is spaced from the outer surface of conduit 28 forming annular fluid space 42 and from casing 32 forming annular fluid chamber 44. End caps 38 and 40 are spaced respectively from wall members 34 and 36 to provide fluid chambers 46 and 48. Shell side fluid port 50 is provided in casing 32, header side fluid ports 52 and 54 are respectively provided in caps 38 and 40.

In the fabrication of the module we have found that it is desirable to prepare an aggregate of hollow filaments wound at an appropriate angle from about 30° to 80°. An ordinary textile winding machine, such as a Leesona 959 or the like, used in the initial preparation of the wound up package which is annulus 22. In place of the ordinary tubular core or bobbin, shell 56, which is one of many types of removable support cylinders and is shown in FIG. 2 having split 58 in its wall running parallel to the axis of the shell, is utilized. Wrapped around shell 56 and overhanging it is a strip of woven fabric or scrim 24. Scrim 24 is shown prior to wrapping and in flattened condition in FIG. 3. The scrim is cut on a 45° bias and distorted by stretching in a trellis-like fashion in the direction of the cut line in FIG. 3 or perpendicular thereto providing diamond-like intersection patterns with the long diagonal of the diamond running the long direction of the fabric. The fabric, for example, could be 10 inches wide and 40 inches long after stretching in the 40 inch direction. Fabric 24 is wrapped around shell 56 two or three times with the short diagonal of the diamond parallel to the shell axis, as shown in FIG. 4, and lightly secured to the shell or itself by tape or otherwise by a material not shown. The shell 56 with scrim 24 attached is installed on the package winding machine in the usual fashion and the single hollow filaments or small bundle of filaments is wound thereon forming annulus of filaments 22. The helix angle of the wind can be a conventional one ordinarily employed in the winding of typical textile yarns on packages. If a bundle is to be wound, it may or may not be sized or coated in some way to buffer the filaments from abrasion damage as the package builds.

Winding is carried out on shell 56 plus scrim underlayer 24 to a moderate depth, for example, 1 inch. This winding is carried out at a moderately low tension. In FIG. 5 one layer of the filaments which provide annulus of filaments 22 is illustrated helically wound and indicated by the numeral 22a. The letter A in FIG. 5 indicates the helix angle. The next layer of filaments is placed thereon by winding in a helix of opposite hand and the two layers of filaments as illustrated in FIG. 5 are indicated by the numeral 22b.

After the winding has been completed and annulus of filaments 22 formed, the second strip of scrim or outer fabric 26 is wrapped around the outside of the helically wound filaments with the diamonds of fabric 26 oriented as they were in the inner fabric 24 as shown in FIG. 6.

Outer fabric 26 is also lightly secured to itself or to the outer wraps of filament beneath.

The package comprised of the split shell 56, inner layer of fabric 24, annulus of filaments 22, and outer fabric 26 is removed as an integral unit from the winder. The split shell 56 is then withdrawn from inside the other layers, as shown in FIG. 7

The extreme outer edges of scrim 24 and 26 are then gripped in a suitable clamping arrangement either in the cylindrical shape or by first being partially flattened. The entire assemblage of scrim, both inner and outer, and filaments is then extended parallel to the axial direction of the original cylinder, as shown in FIG. 8. The axial length can then be extended on the order of up to five times the original package length. The scrim layers in woven form are designed to stretch easily and thereby not impede but rather to aid and assist and to guide the extension. The annular helically wrapped assemblage of hollow filaments or bundles under the urging action of the two layers of scrim 24 and 26 is reorganized by stretching in a trellising fashion whereby the normal helix angle originally imparted during the winding is decreased and the axial length of the bundle increased by a similar multiple as that for the scrim. The phenomenon may be likened to the axial growth under tension of Chinese finger cuffs. The net effect of this is to convert by way of example an annular filament assemblage 6 inches long with an outside diameter of 7 inches and an inside diameter of 6 inches to another annular assemblage as much as 30 inches long with an inside and outside diameter substantially reduced to perhaps as little as 1½ and 2½ inches respectively. The scrim and the annulus of filaments are now reoriented so that the diamond-like yarn pattern of the scrim has its long diagonal parallel to the original axis of the package and the filament array is lengthened, as described above. The package thus produced is a coreless annular array of helically wound hollow semi-permeable filaments and can thereafter be processed in convenient fashion for embedding of filament ends and assembly with a fluid conduit disposed inside the annulus.

Figure 10B:
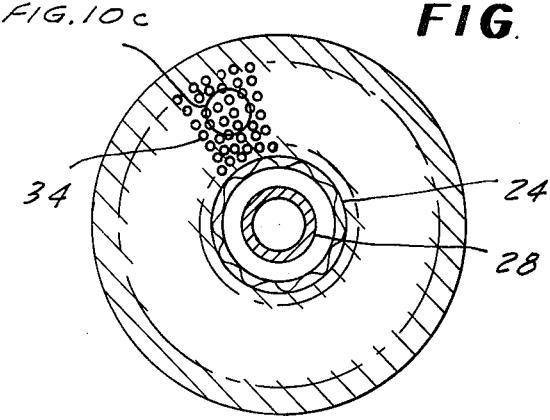
FIG. 10b is a sectional view taken along the line 10b—10b in the direction of the arrows in FIG. 10.
Figure 10C:
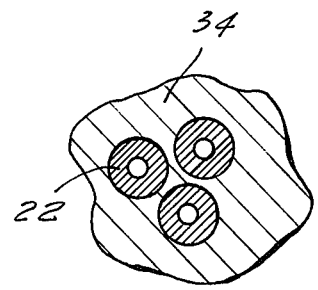
FIG. 10c is an enlarged segmentary view of the embedding medium used for closure in the subject device with hollow filaments shown embedded therein.

FIGS. 10-13 as well as FIG. 1 show the module completely assembled. Conduit 28 containing perforations 30 lies along the longitudinal axis of annulus 22. It should be noted that substantially any tube which permits fluid flow through the walls can be used, such as tubes with highly porous walls. Also, in certain applications it may not be necessary to include such a conduit. Cylindrical wall members 34 and 36 are formed or cast of suitable material or embedding compound with filament ends extending therethrough. The filament ends extend through the wall members obliquely and are open at the exterior of the wall members in order to communicate the inside of each hollow filament with the fluid chambers formed by the wall members and end caps 38 and 40. Hence the inside of filaments passing through wall 34 communicate with fluid chamber 46 between end cap 38 and wall 34 and filaments passing through wall 36 communicate with fluid chamber 48 between end cap 40 and wall 36. This is illustrated in FIG. 13.

The helically disposed filaments comprising annulus 23 and contained between the inner and outer scrim fabrics are spaced from the outer wall of feed pipe 28 providing a chamber or annular space 42 thereby reducing the possibility of interference with the free flow of material through perforations 30. Outer casing 32 which extends between the end plates completing fluid chambers 46 and 48 is also spaced from annulus 22 providing an annular fluid chamber 44. O-rings 57 and 59 reside in grooves in the wall members to sealingly separate the fluid chambers 46 and 48 from the fluid chamber 44.

The final module fabricated in accordance with the teachings of this invention can be operated in several different modes. The most commonly used is for the feed to enter through the central conduit 28 and flow radially outward through perforations 30 through the filament array and out the port 50 provided in the casing 32. Materials passing through the walls of the hollow filaments will be transmitted through the filament lumens to fluid chambers 46 and 48 and be emitted from these chambers through ports 52 and 54. The device is also capable of radially inward flow mode wherein feed enters through the port 50 in the outer shell 32 and flows radially inward through the filament array and exits through the central conduit 28. Again, materials separated from this flow by permeating the walls of the hollow filaments of annulus 22 will be collected in fluid chambers 46 and 48 and exit the assembly through ports 52 and 54. Other variations and usages can be accomplished according to the particular mode of operation.

It is significant therefore that we have provided herein a satisfactory module which can be readily fabricated through the use of ordinary winding techniques and which in its completed form will operate satisfactorily as a separatory device and in a manner far superior to many of those presently available.

We claim:

1. The method of producing a hollow filament separatory module including the steps of winding a plurality of layers of semi-permeable hollow filaments on a removable cylindrical support to create an annulus of filaments, each of said layers being helically wound at an angle to the axis of the winding support with adjacent layers wound in opposite hand, removing the cylindrical support, extending the annular filament array parallel to the axial direction by application of force to substantially increase the length in the order of up to five times the original length while decreasing the diameter of the annulus and decreasing the helix angle imparted to the wound filaments during the winding by a similar multiple, opening ends of filaments of the annulus and isolating said open ends from the main portions of the filaments, and providing a first means for allowing fluid to flow in contact with the outer surfaces of said filaments at the main portions thereof and providing a second means to allow fluid to flow within said hollow filaments and through the open ends thereof.

2. The method of producing a hollow filament separatory module including the steps of wrapping an extensible member around a removable cylindrical support, winding a plurality of layers of semi-permeable hollow filaments on said extensible member to create an annulus of filaments, each of said layers being helically wound at an angle to the axis of the winding support with adjacent layers would in opposite hand, removing the cylindrical support, extending the assembly of annular filament array and extensible member parallel to the axial direction by application of force to substantially increase the length in order of up to five times the original length while decreasing the diameter of the annulus and decreasing the helix angle imparted to the wound filaments during the winding by a similar multiple, opening ends of filaments of the annulus and isolating said open ends from the main portions of the filaments, and providing a first means for allowing fluid to flow in contact with the outer surfaces of said filaments at the main portions thereof and providing a second means to allow fluid to flow within said hollow filaments and through the open ends thereof.

3. The method of producing a hollow filament separatory module in accordance with claim 2 in which the extensible member is a macroporous sheet-like member.

4. The method of producing a hollow filament separatory module in accordance with claim 2 in which the extensible member is sheet-like elastic.

5. The method of producing a hollow filament separatory module including the steps of wrapping a first extensible sheet-like member around a removable cylindrical support, winding a plurality of layers of semi-permeable hollow filaments on said extensible member to create an annulus of filaments, each of said layers being helically wound at an angle to the axis of the winding support with adjacent layers wound in opposite hand, wrapping a second extensible sheet-like member over said annulus of filaments, removing the cylindrical support, extending the assembly of annular filament array and first and second extensible members parallel to the axial direction by application of force to substantially increase the length in the order of up to five times the original length while decreasing the diameter of the annulus and decreasing the helix angle imparted to the wound filaments during the winding by a similar multiple, opening ends of filaments of the annulus and isolating said open ends from the main portions of the filaments, and providing a first means for allowing fluid to flow in contact with the outer surfaces of said filaments at the main portions thereof and providing a second means to allow fluid to flow within said hollow filaments and through the open ends thereof.

* * * * *